United States Patent [19]

Reinartz et al.

[11] Patent Number: 4,736,995
[45] Date of Patent: Apr. 12, 1988

[54] BRAKE SLIP CONTROL APPARATUS FED WITH AUXILIARY ENERGY FOR USE IN A VEHICULAR HYDRAULIC BRAKE SYSTEM

[75] Inventors: Hans-Dieter Reinartz, Frankfurt am Main; Helmut Steffes, Hattersheim; Hajo Pickel, Kelkheim, all of Fed. Rep. of Germany

[73] Assignee: Alfred Teves GmbH, Frankfurt am Main, Fed. Rep. of Germany

[21] Appl. No.: 924,801

[22] Filed: Oct. 30, 1986

[30] Foreign Application Priority Data

Oct. 31, 1985 [DE] Fed. Rep. of Germany ....... 3538763

[51] Int. Cl.$^4$ .................................................. B60T 8/32
[52] U.S. Cl. .................................... 303/114; 188/358; 303/52; 303/119
[58] Field of Search ...................................... 303/50–56, 303/114, 113, 119, 92, 117; 188/181 R, 181 A, 358–359; 60/547.1, 550, 553, 591

[56] References Cited

U.S. PATENT DOCUMENTS

| | | | |
|---|---|---|---|
| 4,416,491 | 11/1983 | Belart et al. | 303/113 |
| 4,634,190 | 1/1987 | Wupper | 303/119 X |
| 4,641,895 | 2/1987 | Belart et al. | 303/119 |
| 4,643,487 | 2/1987 | Neubrand | 303/114 |
| 4,678,242 | 7/1987 | Belart | 303/114 X |
| 4,681,375 | 7/1987 | Belart | 303/114 |
| 4,687,259 | 8/1987 | Reinartz et al. | 303/52 X |

FOREIGN PATENT DOCUMENTS 3040562 5/1982 Fed. Rep. of Germany.
3240404 5/1984 Fed. Rep. of Germany.

*Primary Examiner*—Douglas C. Butler
*Attorney, Agent, or Firm*—James B. Raden; Robert P. Seitter

[57] ABSTRACT

A brake slip control apparatus fed with auxiliary energy for use in a vehicular hydraulic brake system, comprising a master-cylinder assembly (12) actuatable by the brake pedal, and with auxiliary energy being supplied into the working chamber (16) of the master cylinder. A resetting piston (49) is arranged axially slidably between stops on the secondary side of the master cylinder piston (23), which piston (49) causes the master cylinder piston (23) to assume a defined position in the event of application with auxiliary energy. To this end, the resetting piston (49) is slidably supported in an annular chamber (47) and, on brake actuation after having overcome a clearance (X), is entrained by the booster piston (57) in the actuating direction. Terminating into the annular chamber (49) is a throttle bore (46) through which pressure fluid out of the annular compartment (36) may enter into the annular chamber (47) in order to urge the resetting piston (49) back to its initial position.

6 Claims, 1 Drawing Sheet

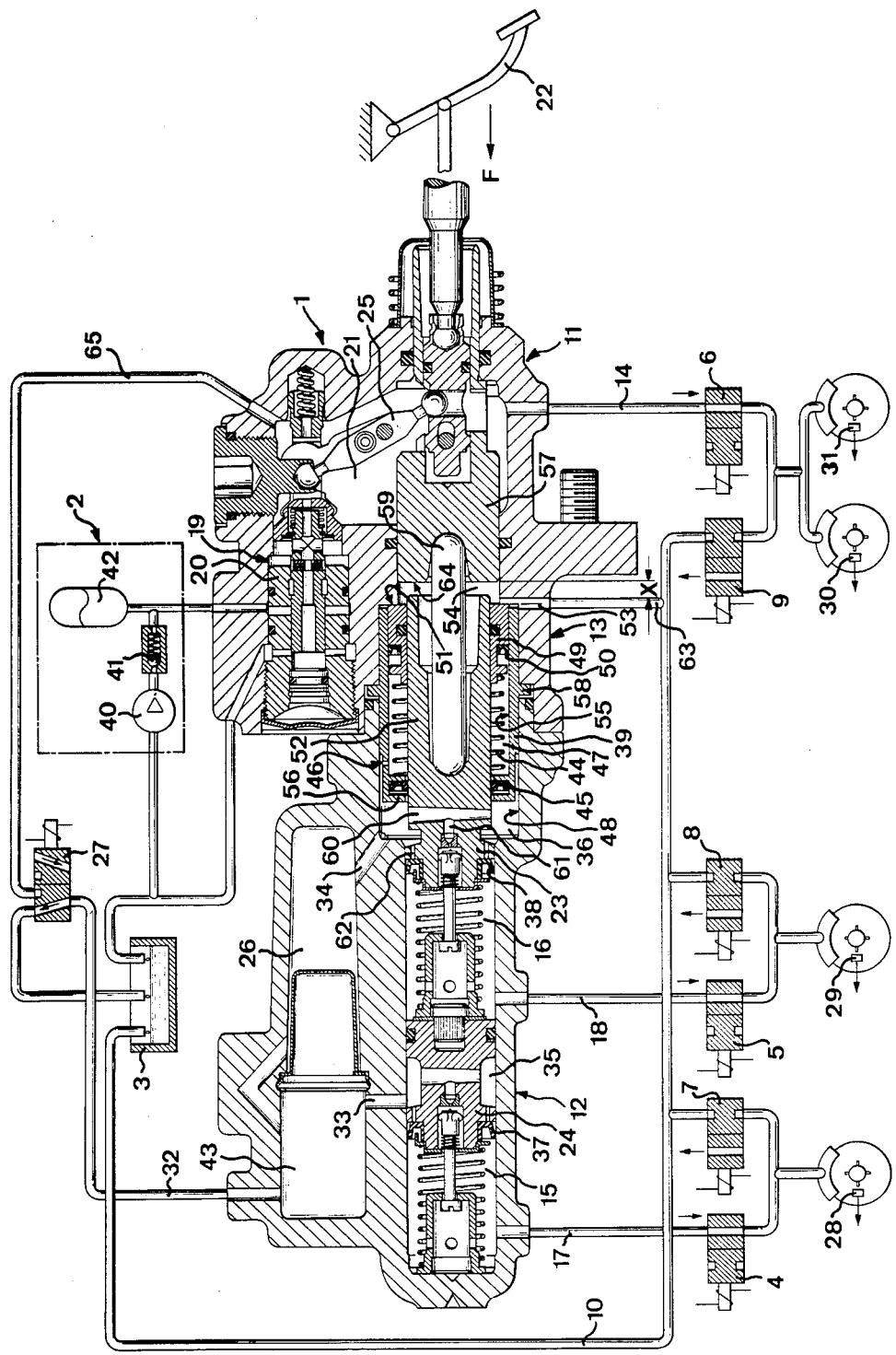

BRAKE SLIP CONTROL APPARATUS FED WITH AUXILIARY ENERGY FOR USE IN A VEHICULAR HYDRAULIC BRAKE SYSTEM

BACKGROUND OF THE INVENTION

The present invention relates to a brake slip control apparatus fed with auxiliary energy for use in a vehicular hydraulic brake system. The apparatus comprises a master cylinder assembly actuatable by the brake pedal and incorporating a master cylinder piston and an assigned prechamber, with a supply bore and with the delivery of auxiliary energy into the working chamber of the master cylinder. A resetting piston which is axially slidable between stops is arranged on the secondary side of the master cylinder piston, the resetting piston having a larger external diameter than the master cylinder piston and being centrically guided through the shank or an actuating rod of the master cylinder piston in a sealed relationship thereto. The master cylinder piston being caused to assume a defined position on acutation of the brake pedal and in the event of the secondary side of the master cylinder piston being applied by auxiliary energy during slip control.

In a known vehicular brake system of this type (P 30 40 562.0), on the secondary side of the master cylinder piston there is provision of a positioning piston which is axially slidable against an axial stop formed fast with the housing and which is sealed relative to the master cylinder housing. The positioning piston having a larger external diameter than the master cylinder piston and the master cylinder piston rod being centrically guided therethrough in a sealed relationship therewith. On depression of the brake pedal and on application of the secondary side of the master cylinder piston with auxiliary energy during slip control, the pedal-side enlarged circumferential end of the master cylinder piston rod or a circumferential projection of a throttle valve of a throttle valve assembly, which is possible inserted upstream, is movable into engagement with an assigned pedal-side circumferential edge of the positioning piston such as to cause the master cylinder piston to assume a defined position during braking with slip control.

However, this known vehicular brake system bears the disadvantage that during control action there is the inherent risk that, when braking is effected at low frictional values, the brake pedal will be displaced in the direction of the master cylinder as far as until the booster piston is abutting on the positioning tube. It is an object of the present invention to improve upon the known positioning device such as to ensure on control action even under extreme conditions that the brake pedal assumes a position which was precisely defined beforehand. In addition, the positioning tube is to be designed such that no kick of resetting will be felt at the brake pedal.

SUMMARY OF THE INVENTION

This object is achieved according to the present invention in that the annularly designed, longitudinally slidable resetting piston cooperating with the booster piston comprises a sealing cup by which it is sealed in relation to the inside wall of a stationary housing part or a positioning tube. A sealing lip of the sealing cup allows the supply of pressure fluid out of the intermediate chamber disposed on the pedal-side end of the resetting piston. The resetting piston bears against a compression spring on the side of the master cylinder, which spring encloses the shank of the master cylinder piston and whose end close to the master cylinder abuts on a stationarily radially inwardly extending wall portion or a collar of the positioning tube. The collar is sealed relative to the shank by means of a cup, and the annular chamber established between the collar and the resetting piston communicates by way of a throttle bore with the annular compartment and the sealing lip of the cup permitting the exit of pressure fluid out of the annular chamber into the prechamber.

Preferably, there is provided a positioning tube enclosing the shank or an actuating rod of the master cylinder piston with play. The cylindrical outer surface of the tube comprises a radially outwardly extending attachment or flange by which it is retained stationarily in a recess or groove of the housing. The end of the positioning tube close to the master cylinder is provided with a radially inwardly extending collar which, at its cylindrical surface facing the shank, includes an annular groove in which a sealing ring or a cup is supported, with which the positioning tube is in sealing abutment on the shank.

Expediently, the positioning tube is held in a bore of the housing of the unit and, together with the shank, the master cylinder piston and the bore, confines an annular compartment which, on the one hand, is by way of a throttle bore in the wall of the positioning tube in communication with the annular chamber formed between positioning tube and shank, while on the other hand, it communicates with the working chamber of the master cylinder by way of bores and/or suction channels contained in the shank or the piston.

Advantageously, the resetting piston is designed as annular piston and is longitudinally slidably supported in an annular chamber constituted by a longitudinal bore of the housing, on the one side, and the shank of the master cylinder piston. The portion of the annular chamber close to the master cylinder communicates by way of a throttle bore with the prechamber or the annular compartment. A sealing element or a valve is arranged in the wall portion isolating the annular chamber from the annular compartment, which sealing element/valve permits the discharge of pressure fluid out of the annular chamber into the annular compartment. However, return flow thereof from the annular compartment into the annular chamber is precluded.

To enable displacement of the resetting piston in the direction of the annular compartment during a braking action, the intermediate chamber bounded by the resetting piston on the pedal side is connected with the supply reservoir by way of a housing port and a pressure fluid line, while the booster piston coupled to the brake piston, after having overcome a clearance of motion, moves into abutment on the pedal-side frontal end of the resetting piston and displaces said in the direction of the master cylinder.

BRIEF DESCRIPTION OF THE DRAWING

The present invention permits various embodiments, one of which is illustrated schematically in more detail in the accompanying drawing wherein the single figure provides a longitudinal cross-section of the wiring diagram of a brake slip control apparatus and the assigned braking pressure generator.

DETAILED DESCRIPTION

As shown in the drawing, the inventive brake slip control apparatus substantially comprises a pedal-actuated elongated hydraulic braking pressure generator which, as a whole, is designated by reference numeral 1, an auxiliary-pressure source 2, a supply and pressure compensating reservoir 3 and electromagnetically actuatable two-way/-two-position directional control valves 4 to 6, by way of which the wheel brakes and, respectively, the front and rear wheels are connected in three hydraulically isolated brake circuits. Valves 4 to 6 assume their opened position normally, that is as long as they are not excited. Additionally, there is provision of a return line 10 leading from the front and the rear wheels to the compensating reservoir 3, which return line, however, is isolated from the wheel brake cylinders by means of three further two-way/-two-position directional control valves 7 to 9 as long as these valves 7 to 9 are not excited. In turn, the braking pressure generator 1 is composed of a hydraulic brake power booster 11 and a master cylinder assembly 12 as well as of a positioning device 13.

One brake circuit, that is the rear-wheel brake circuit 14, is connected directly to the brake power booster 11, while the two working chambers 15 and 16 of the master cylinder assembly 12, which is provided as a tandem master cylinder are connected with each one front wheel by way of separate brake circuits 17 and 18. The two master cylinder circuits of a like arrangement are termed as static pressure-fluid circuits, while the rear-axle circuit is referred to as dynamic pressure-fluid circuit because in this circuit 14 the pressure is defined by the position of a control valve 19 which is pedal-actuated by way of rods 25 and which, depending on the displacement of a valve piston 20, allows more or less pressure out of the auxiliary-energy source 2 to enter into the booster chamber 21 and from there into the brake circuit 14.

The pressure built up in the booster chamber 21 on depression of a brake pedal 22 and introduced through the control valve 19, respectively, acts on the pistons 23, 24 of the master cylinder assembly 12 simultaneously and has as a result development of braking pressure in the working chambers 15 and 16 of the two static brake circuits 17, 18 which lead to the front wheels. First, atmospheric pressure prevails in two prechambers 26, 43 of the master cylinder assembly 12 because these chambers are in communication with the pressure-compensating reservoir 3 by way of a so-termed main valve 27 in the inactive position thereof, that is when the valve is not excited.

At each wheel of the vehicle equipped with the brake system in accordance with the present invention, there is arranged a sensor 28, 29, 30, 31 which is designed, for example, as an inductive pick-up for measuring data and which feeds information about the wheel rotational behavior into an electronic control unit. This control unit contains among others an electronic combining logic in the form of hard-wired or programmed circuits, such as microprocessors, and after evaluation of the sensor signals generates control commands which are delivered to the corresponding solenoid valves 4 to 9 and 27 by way of signal lines (not shown).

Upon commencement of brake slip control, the main valve 27 changes over. This opens a pressure-fluid conduit 32 leading from the booster chamber 21 into the prechambers 26, 43 so that pressure fluid flows into the prechambers 26, 43. This pressure is supplied further through connecting channels 33, 34 to annular compartments 35, 36 inside the master cylinder assembly 12. From these annular compartments 35, 36, pressure will propagate through cup seals 37, 38 arranged at the periphery of the pistons 23, 24 and performing the function of non-return valves and will be introduced dynamically into the working chambers 15, 16 which are in communication with the wheel brakes of the front wheels.

A positioning tube 39 is sealed in relation to the shank 52 of the master cylinder piston 23 by means of a lip seal 45 and comprises a throttle bore 46, through which the pressure fluid enters into the annular chamber 47 and resets the resetting piston 49 in the direction of the booster. When in its inactive position, the resetting piston 49 abuts on the step 51 and, moreover, is acted upon by a compression spring 44 which in turn is supported on the positioning tube 39. The intermediate chamber 54 is connected to the return line 10 by way of the port 53. In the event of normal brake operation, the excess fluid volume is discharged out of the chamber 47 through the cup seal 45.

When the brake pedal 22 is depressed, the booster piston 57 is displaced to the left. After having covered the distance X, the resetting piston 49 will be entrained. As a result, the volume in the annular chamber 47 will decrease. The excess fluid volume is discharged by way of the cup seal 45 into the annular compartment 36. In the event of anti-skid control being activated now, fluid will propagate through the channel 34 into the annular compartment 36 and through the throttle bore 46 into the annular chamber 47. The resetting piston 49 is reset in a damped manner. No kick will occur at the brake pedal 22. In the event of braking without anti-skid control, the resetting piston 49 will be reset by the spring 44. Fluid is sucked out of the intermediate chamber 54 via the cup 50. As only low forces are necessary for this purpose, the spring 44 may be dimensioned comparatively weak.

Because of the dynamic introduction of pressure fluid into the static brake circuits 17, 18 of the front wheels and into the annular compartment 36 which is of decisive important for the resetting pressure exerted on the positioning tube 39, the working chambers 15 and 16 are prevented from becoming empty due to control, and not even in the event of frequent pressure decrease caused by discharge of pressure fluid by way of the switched-over valves 7 and 8.

Upon the occurrence of a defect in the auxiliary-energy supply system 2, herein comprised of a pressure-fluid pump 40 with the associated non-return valve 41 and of a pressure-fluid accumulator 42, a pressure alarm circuit (not illustrated) will respond, and will signal this condition to the electric control unit of the brake system and—depending on the magnitude of the residual pressure—will cause partial de-activation or disconnection of the brake slip control. This pressure alarm circuit is necessary because the auxiliary energy is used also during normal braking without slip control for brake force boosting in the static pressure circuits 17, 18 and for braking pressure generation in the dynamic brake circuit 14.

As can be seen by reference to the drawing, the diameter of the shank 52 is sized less than the diameter of the booster piston 57 so that, when the brake is applied, after the clearance X has been overcome, the end surface close to the master cylinder, that is the abutment surface 64, will move into abutment on the pedal-side end surface of the resetting piston 49, and the booster piston 57 will entrain the resetting piston 49 upon its further movement in the actuating direction. Furthermore, as can be seen in the drawing, the bore 48 in the housing of the braking pressure generator has a step 51 which is dimensioned such that the resetting piston 49 will come to bear thereagainst when the brake is released.

What is claimed is:

1. A brake slip control apparatus fed with auxiliary energy for use in a vehicular hydraulic brake system, comprising a master cylinder including a housing and a master cylinder assembly (12) actuatable by a brake pedal, said master cylinder assembly including a master cylinder piston (23), an annular compartment (36) and a supply bore (34) for the delivery of auxiliary energy into a working chamber (16) of the master cylinder, a resetting piston (49) axially slidable between stops arranged on a secondary side of the master cylinder piston (23), said resetting piston having a larger external diameter than the master cylinder piston (23) and being centrically guided through a shank (52) of the master cylinder piston (23) in a sealed relationship thereto, the master cylinder piston (23) being caused to assume a defined position on actuation of the brake pedal (22) and in the event of the secondary side of the master cylinder piston (23) being applied by auxiliary energy during slip control, wherein the longitudinally slidable resetting piston (49) cooperates with a booster piston (57) and comprises a sealing cup (50) by which it is sealed in relation to the inside wall (55) of a positioning tube (39), a sealing lip of the sealing cup (50) allowing the replenishment of pressure fluid out of an intermediate chamber (54) disposed on the pedal-side end of the resetting piston (49), said resetting piston (49) bearing against a compression spring (44) on the side of the master cylinder, which spring encloses the shank (52) of the master cylinder piston (23) and whose end close to the master cylinder abuts on a stationarily radially inwardly extending collar (56) of the positioning tube (39), said collar (56) being sealed relative to the shank (52) by means of a cup seal (45), and an annular chamber (47) established between the collar (56) and the resetting piston (49) communicating by way of a throttle bore (46) with the annular compartment (36) and the sealing lip of the cup seal (45) permitting the exit of pressure fluid out of the annular chamber (47) into the annular compartment (36).

2. A brake slip control apparatus fed with auxiliary energy as claimed in claim 1, wherein said positioning tube (39) encloses the shank (52) of the master cylinder piston (23) with a predetermined play, the cylindrical outer surface of the tube comprising a radially outwardly extending flange (58) by which it is retained stationarily in a recess of the housing, with the end of the positioning tube (39) close to the master cylinder assembly being provided with said radially inwardly extending collar (56) which, at its cylindrical surface facing the shank (52), includes an annular groove in which said cup seal (45) is supported, with which the positioning tube (39) is in sealing abutment on the shank (52).

3. A brake slip control apparatus fed with auxiliary energy as claimed in claim 2, wherein the positioning tube (39) is held in a bore (48) of the housing of the unit and, together with the shank (52), the master cylinder piston (23) and the bore (48), confines the annular compartment (36) which, by way of the throttle bore (46) in the wall of the position tube (39) is in communication with the annular chamber (47) formed between positioning tube (39) and shank (52), while it further communicates with the working chamber (16) of the master cylinder (12) by way of bores (60, 61) and suction channels (62) contained in the shank (52) and the master cylinder piston (23).

4. A brake slip control apparatus fed with auxiliary energy as claimed in claim 3, wherein the resetting piston (49) is provided as an annular piston and is longitudinally slidably supported in the annular chamber, said annular chamber being constituted by a longitudinal bore of the housing, on the one side, and the shank (52) of the master cylinder piston (23), the portion of the annular chamber close to the master cylinder communicating by way of a throttle bore with the prechamber (26) and the annular compartment (36), and with an isolating element arranged in the wall portion isolating the annular chamber from the annular compartment (36) on the master cylinder side, which isolating element permits discharge of pressure fluid out of the annular chamber into the annular compartment (36) but precludes return flow thereof from the annular compartment (36) into the annular chamber.

5. A brake slip control apparatus fed with auxiliary energy as claimed in claim 4, wherein an intermediate chamber (54) bounded by the resetting piston (49) on the pedal side is connected with the supply reservoir (3) by way of a housing port (53) and a pressure fluid line (63, 10), while on brake application the booster piston (57) coupled to the brake pedal (22), after having overcome a clearance of motion (X), moves into abutment on the pedal-side frontal end of the resetting piston (49) and displaces the resetting piston in the direction of the master cylinder (12).

6. A brake slip control apparatus fed with auxiliary energy as claimed in claim 5, wherein one of said stops is a stationary step (51) is provided at the housing for the purpose of limitation of the stroke movement of the resetting piston (49) in the direction of the booster piston (57), the booster piston (57) being provided with a stop surface (64) by which it abuts on the resetting piston (49), after having overcome a clearance (X) and entrains said piston (49) in the actuating direction.

* * * * *